(12) United States Patent
Katsume et al.

(10) Patent No.: US 11,695,308 B2
(45) Date of Patent: Jul. 4, 2023

(54) STATOR AND MANUFACTURING METHOD OF THE SAME

(71) Applicant: SUBARU CORPORATION, Tokyo (JP)

(72) Inventors: Akihito Katsume, Tokyo (JP); Kenichi Fukunaga, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 154 days.

(21) Appl. No.: 17/236,845

(22) Filed: Apr. 21, 2021

(65) Prior Publication Data

US 2021/0359562 A1 Nov. 18, 2021

(30) Foreign Application Priority Data

May 15, 2020 (JP) ................................ 2020-085662

(51) Int. Cl.
*H02K 3/12* (2006.01)
*H02K 1/16* (2006.01)
*H02K 15/06* (2006.01)
*H02K 3/28* (2006.01)
*H02K 11/25* (2016.01)

(52) U.S. Cl.
CPC ............... *H02K 3/12* (2013.01); *H02K 1/16* (2013.01); *H02K 3/28* (2013.01); *H02K 11/25* (2016.01); *H02K 15/064* (2013.01)

(58) Field of Classification Search
CPC ..................................................... H02K 11/25
USPC ....................................................... 310/66 C
See application file for complete search history.

(56) References Cited

U.S. PATENT DOCUMENTS 10,263,498 B2 * 4/2019 Takei .................... H02K 11/27
10,923,991 B2 * 2/2021 Dunn .................... H02K 7/006
(Continued)

FOREIGN PATENT DOCUMENTS

JP 2012-175861 A 9/2012
JP 2012175861 A * 9/2012
(Continued)

OTHER PUBLICATIONS

Machine translation of JP 2012-175861 A (Year: 2012).*

*Primary Examiner* — Ahmed Elnakib
*Assistant Examiner* — Minki Chang
(74) *Attorney, Agent, or Firm* — McGinn I.P. Law Group, PLLC.

(57) ABSTRACT

A stator for a rotary electric machine includes a stator core, a stator winding, and a sensor unit. The stator has a hollow cylindrical shape and includes slots. The stator winding includes segment conductors respectively inserted in the slots. The sensor unit includes a sensor holding conductor, and a temperature sensor. The sensor holding conductor is welded to first and second segment conductors among the segment conductors. The temperature sensor is held by the sensor holding conductor. The sensor holding conductor includes first and second end portions, and a bent portion. The first end portion is welded to an end portion of the first segment conductor. The second end portion is welded to an end portion of the second segment conductor. The bent portion couples the first end portion and the second end portion to each other. The temperature sensor is held at an inner side of the bent portion.

17 Claims, 13 Drawing Sheets

(56) References Cited

U.S. PATENT DOCUMENTS

| | | | |
|---|---|---|---|
| 2013/0320817 A1* | 12/2013 | Marschall | H02K 11/25 |
| | | | 310/68 C |
| 2015/0295477 A1 | 10/2015 | Koizumi et al. | |
| 2021/0344247 A1* | 11/2021 | Tsuchiya | H02K 3/50 |
| 2022/0149691 A1* | 5/2022 | Willacker | G01K 1/16 |
| 2022/0344247 A1* | 10/2022 | Mallik | H01L 23/5389 |

FOREIGN PATENT DOCUMENTS

| | | |
|---|---|---|
| JP | 2014-090546 A | 5/2014 |
| JP | 2016-214011 A | 12/2016 |
| JP | 2018-088790 A | 6/2018 |

* cited by examiner

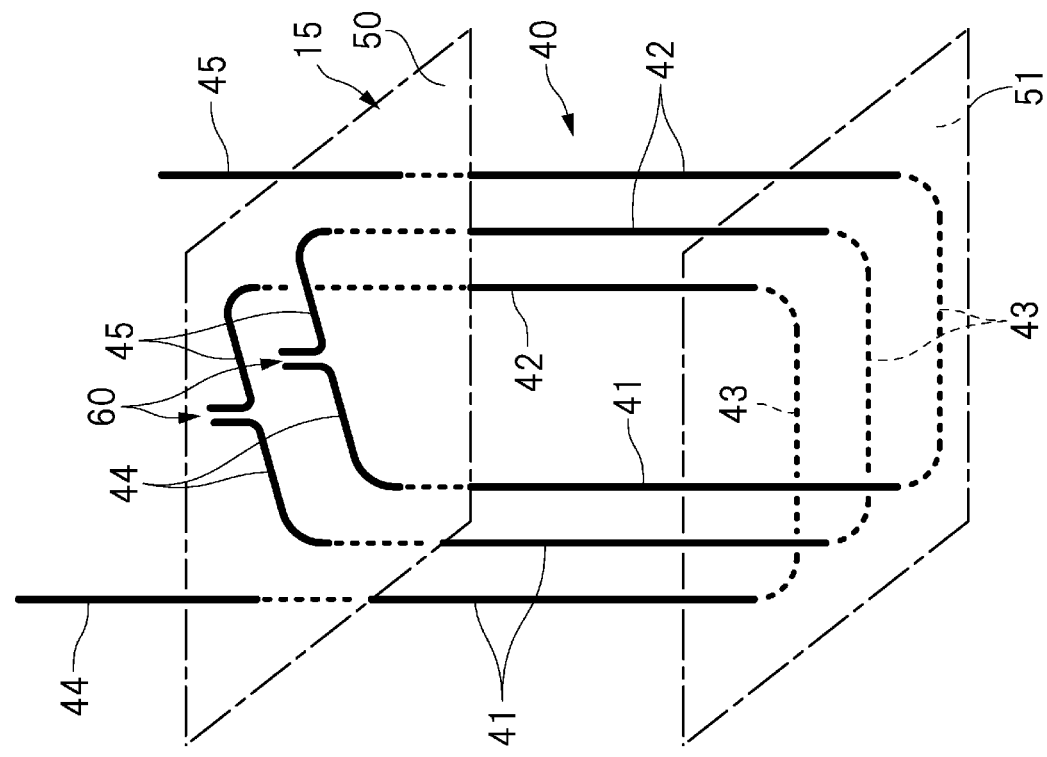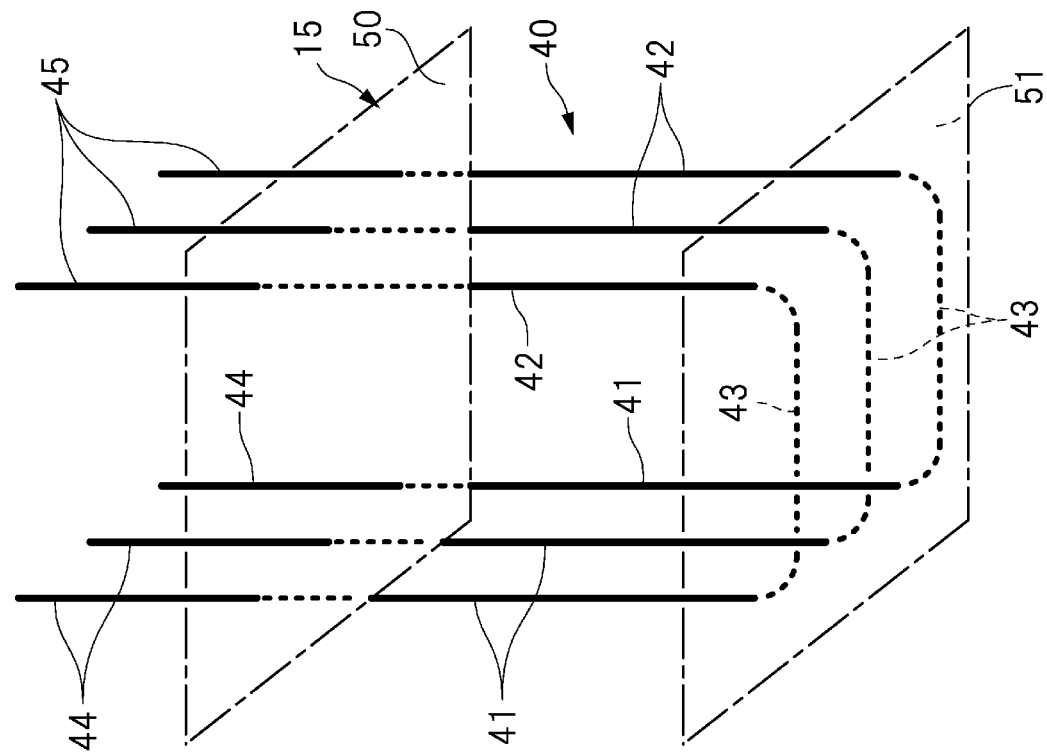

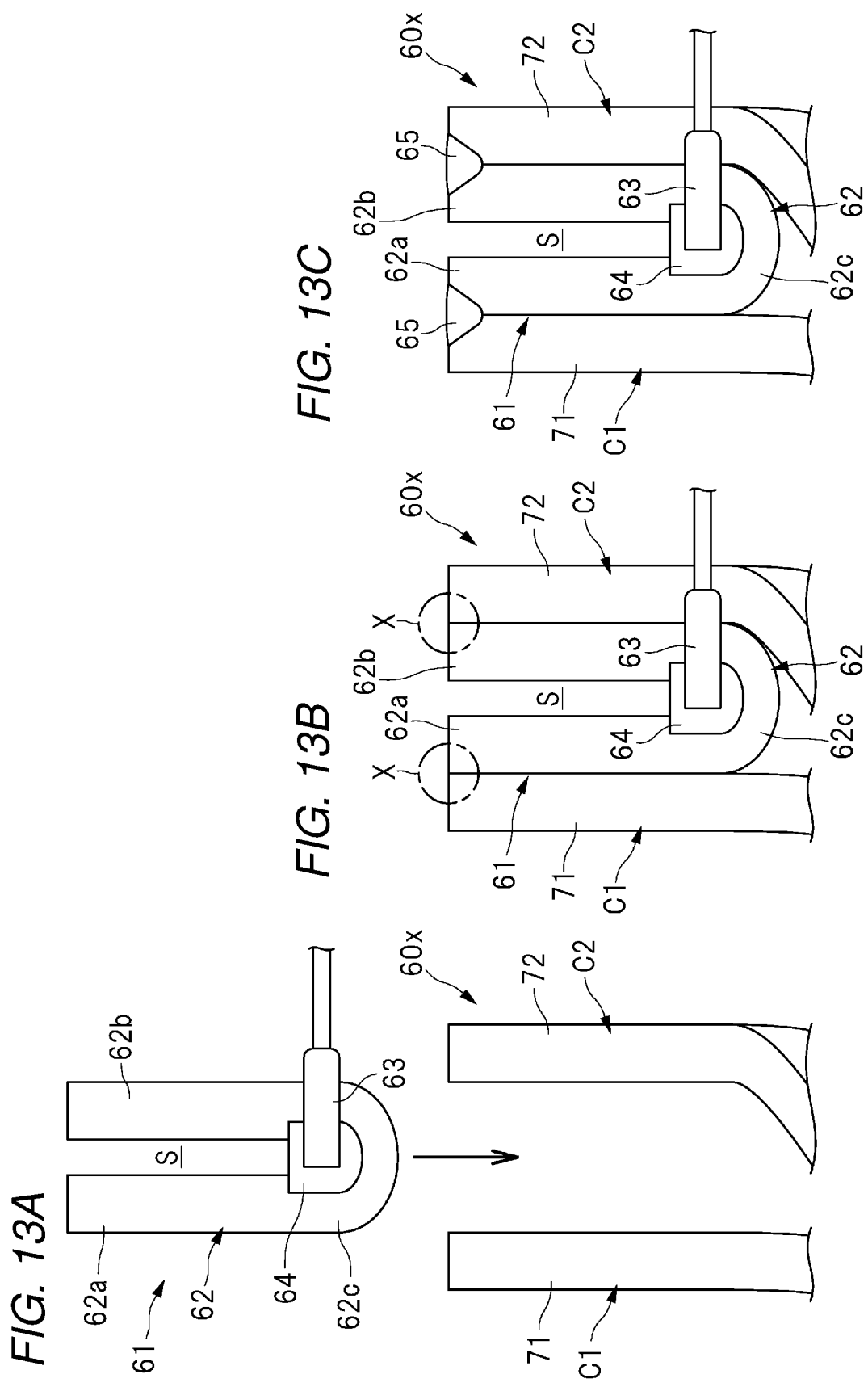

STATOR AND MANUFACTURING METHOD OF THE SAME

CROSS-REFERENCE TO RELATED APPLICATIONS

The present application claims priority from Japanese Patent Application No. 2020-085662 filed on May 15, 2020, the entire contents of which are hereby incorporated by reference.

BACKGROUND

The disclosure relates to a stator of a rotary electric machine and a manufacturing method of the same.

A rotary electric machine, such as an electric motor and a generator, includes a stator wound with a stator coil. As such a stator coil, there have been proposed stator coils including plural segment coils bent substantially in a U shape (see Japanese Unexamined Patent Application Publication (JP-A) No. 2014-90546, JP-A No. 2016-214011, JP-A No. 2018-88790, and JP-A No. 2012-175861).

SUMMARY

An aspect of the disclosure provides a stator configured to be installed in a rotary electric machine. The stator includes a stator core, a stator winding, and a sensor unit. The stator core has a hollow cylindrical shape, and includes slots. The stator winding includes segment conductors respectively inserted in the slots. The segment conductors include a first segment conductor and a second segment conductor. The sensor unit includes a sensor holding conductor, and a temperature sensor. The sensor holding conductor is welded to the first segment conductor and the second segment conductor. The temperature sensor is held by the sensor holding conductor. The sensor holding conductor includes a first end portion, a second end portion, and a bent portion. The first end portion is welded to an end portion of the first segment conductor. The second end portion is welded to an end portion of the second segment conductor. The bent portion couples the first end portion and the second end portion to each other. The temperature sensor is held on an inner side of the bent portion.

An aspect of the disclosure provides a manufacturing method of a stator configured to be installed in a rotary electric machine. The method includes inserting segment conductors respectively into slots formed in a stator core having a hollow cylindrical shape. The method includes bending end portions of the segment conductors which protrude from an end surface of the stator core so as to arrange conductor joint portions in both of a circumferential direction and a radial direction of the stator core. The conductor joint portions include the end portions of the segment conductors. The method includes temporarily attaching a sensor unit between a first segment conductor and a second segment conductor that constitute one of the conductor joint portions. The sensor unit includes a sensor holding conductor and a temperature sensor. The method includes welding the conductor joint portions individually so as to form a stator winding with the segment conductors. The welding includes welding the first segment conductor and the sensor holding conductor to each other. The welding includes welding the second segment conductor and the sensor holding conductor to each other.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

FIGS. 6A and 6B are diagrams illustrating an example of a coupling state of the segment coils.

FIGS. 13A to 13C are diagrams illustrating an attachment process of the sensor unit to the conductor joint portion.

DETAILED DESCRIPTION

Figure 1:
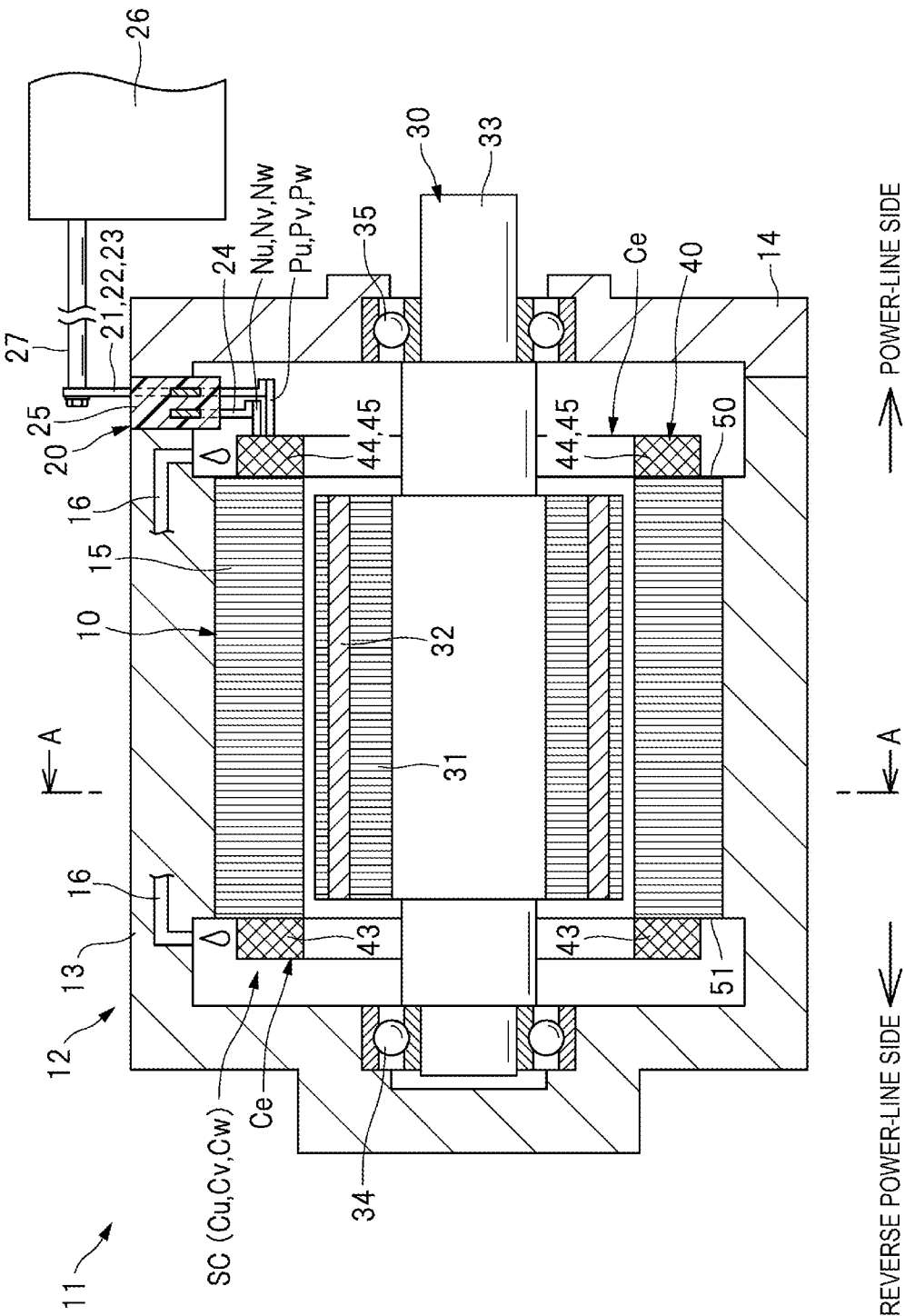
FIG. 1 is a cross-sectional view of an example of a rotary electric machine including a stator according to an embodiment of the disclosure.

Since a stator coil generates heat when powered, temperature of the stator coil is to be monitored to appropriately control a rotary electric machine. In view of this, a temperature sensor such as a thermistor is attached to bus bars coupled to power points and neutral points of the stator coil. However, because the bus bars provided with the temperature sensor are disposed apart from the stator coil in many cases, it was difficult to detect the temperature of the stator coil appropriately.

It is desirable to appropriately detect the temperature of the stator coil.

In the following, some preferred but non-limiting implementations of the disclosure are described in detail with reference to the accompanying drawings. Note that sizes, materials, specific values, and any other factors illustrated in respective implementations are illustrative for easier understanding of the disclosure, and are not intended to limit the scope of the disclosure unless otherwise specifically stated. Further, elements in the following example implementations which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the technology are unillustrated in the drawings. The drawings are schematic and are not intended to be drawn to scale.

In the following description, as a rotary electric machine 11 including a stator 10 according to an embodiment of the disclosure, a three-phase alternating current synchronous motor-generator mounted on an electric vehicle, a hybrid vehicle, and other vehicles will be given as an example. However, this is not to be construed in a limiting sense. Any rotary electric machine may be applied insofar as the rotary electric machine includes the stator 10 assembled with segment coils 40.

Configuration of Rotary Electric Machine

FIG. 1 is a cross-sectional view of an example of the rotary electric machine 11 including the stator 10 according to the embodiment of the disclosure. As illustrated in FIG. 1, the rotary electric machine 11 is a motor-generator and includes a motor housing 12. The motor housing 12 includes a housing body 13 of a bottomed, hollow cylindrical shape, and an end cover 14 that closes an open end of the housing body 13. The stator 10 is secured in the housing body 13 and includes a stator core 15 of a hollow cylindrical shape that includes plural silicon steel sheets, for example, and a three-phase stator coil SC wound on the stator core 15. In one example, the stator coil SC may serve as a "stator winding". It is noted that an oil passage 16 to guide oil is formed in the motor housing 12. Via this oil passage 16, cooling oil is supplied to a coil end Ce of the stator coil SC.

A bus bar unit 20 is coupled to the coil end Ce of the stator coil SC. This bus bar unit 20 includes three power bus bars 21, 22, and 23 coupled to three power points Pu, Pv, and Pw of the stator coil SC, a neutral bus bar 24 that couples three neutral points Nu, Nv, and Nw of the stator coil SC to one another, and an insulating member 25 to hold these bus bars 21, 22, 23, and 24. End portions of the power bus bars 21, 22, and 23 protrude outward from the motor housing 12, and a power cable 27 extending from an inverter 26, for example, is coupled to each of the power bus bars 21, 22, and 23.

A rotor 30 of a solid cylindrical shape is rotatably accommodated in a center of the stator core 15. This rotor 30 includes a rotor core 31 of a hollow cylindrical shape that includes plural silicon steel sheets, for example, plural permanent magnets 32 buried in the rotor core 31, and a rotor shaft 33 secured in a center of the rotor core 31. One end of the rotor shaft 33 is supported by a bearing 34 disposed on the housing body 13, and the other end of the rotor shaft 33 is supported by a bearing 35 disposed on the end cover 14.

Configuration of Stator

Figure 2:
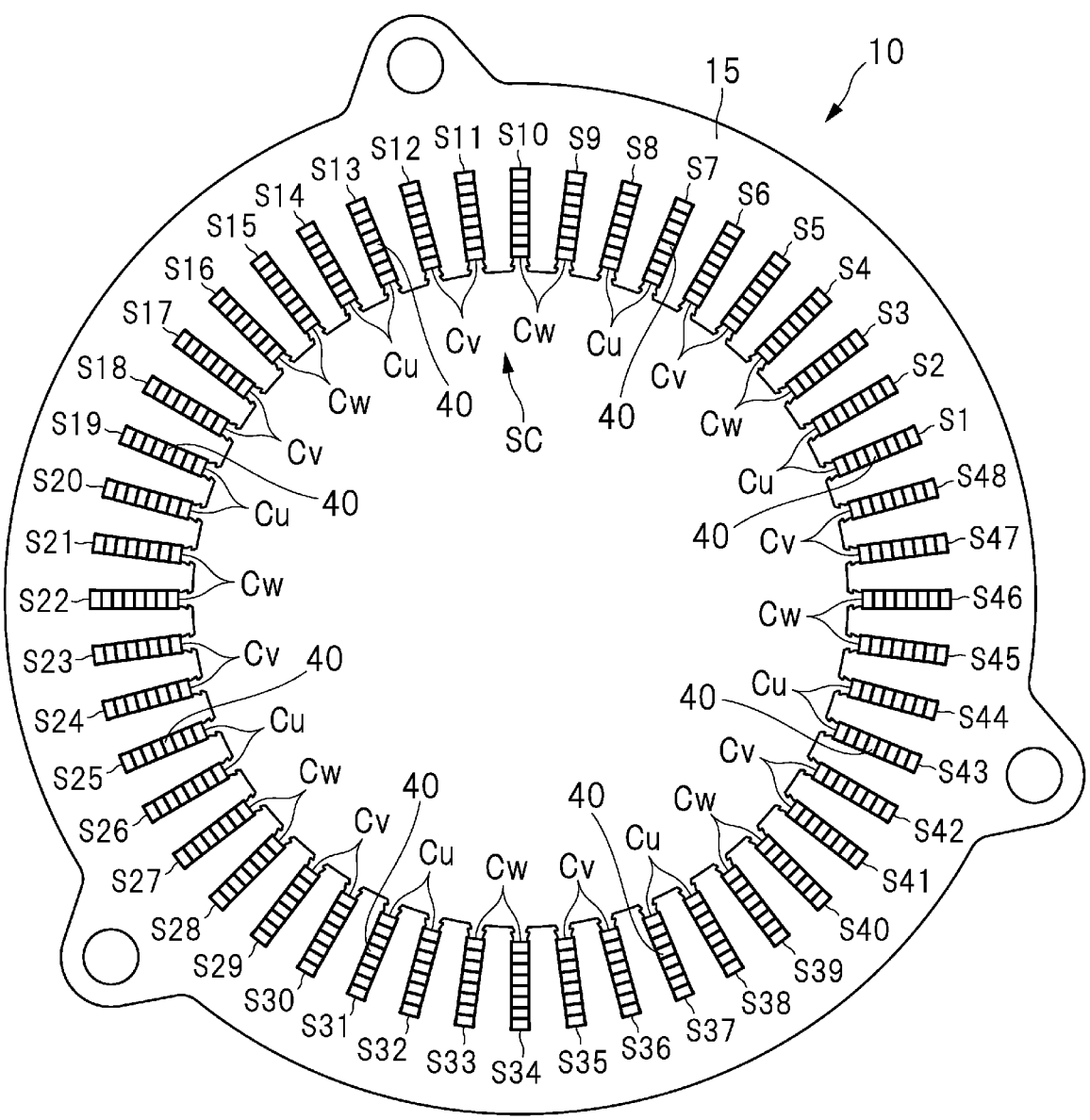
FIG. 2 is a cross-sectional view of the stator taken along line A-A in FIG. 1.
Figure 3:
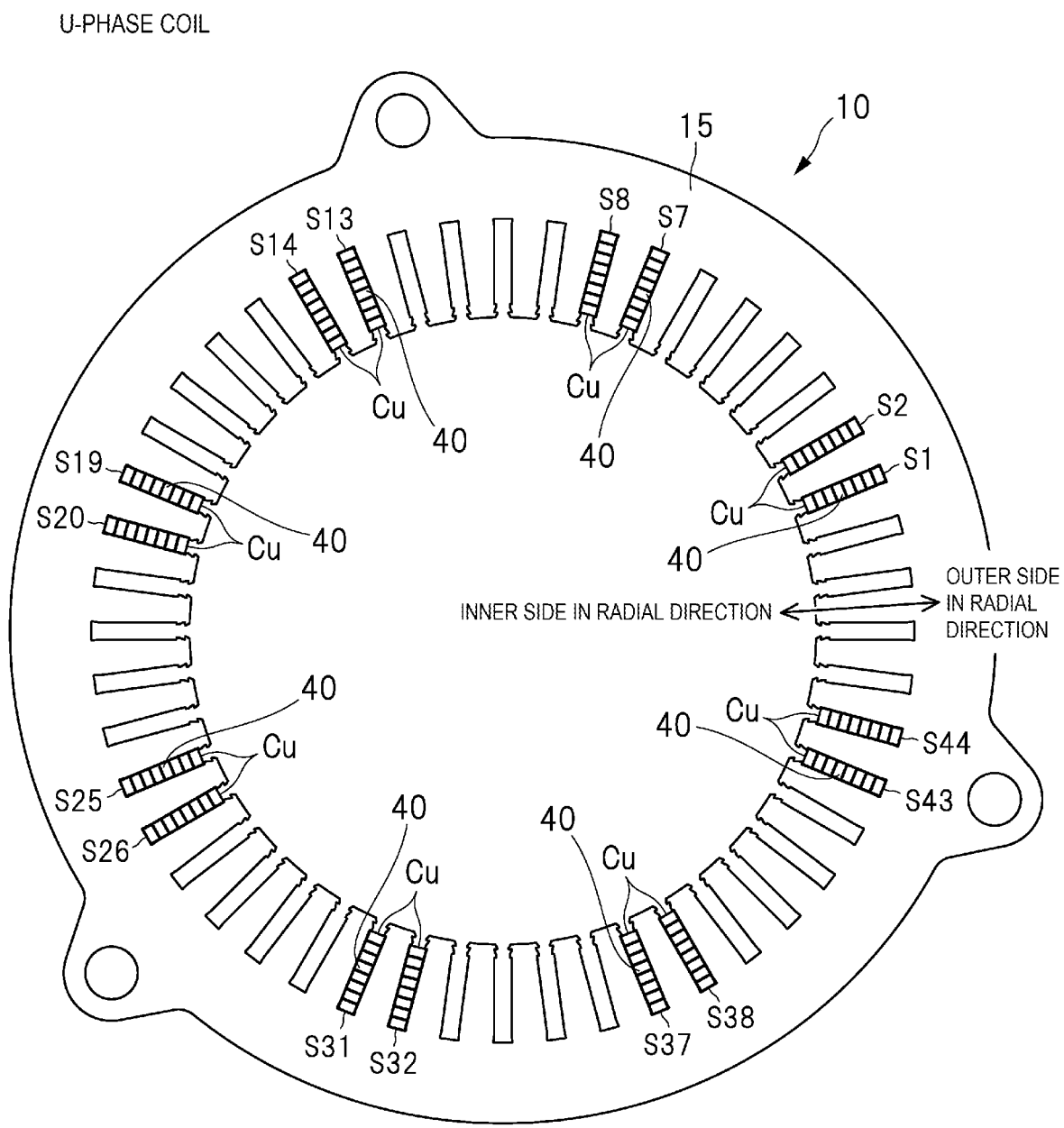
FIG. 3 is a cross-sectional view of a stator core including phase windings of a U phase.
Figure 4:
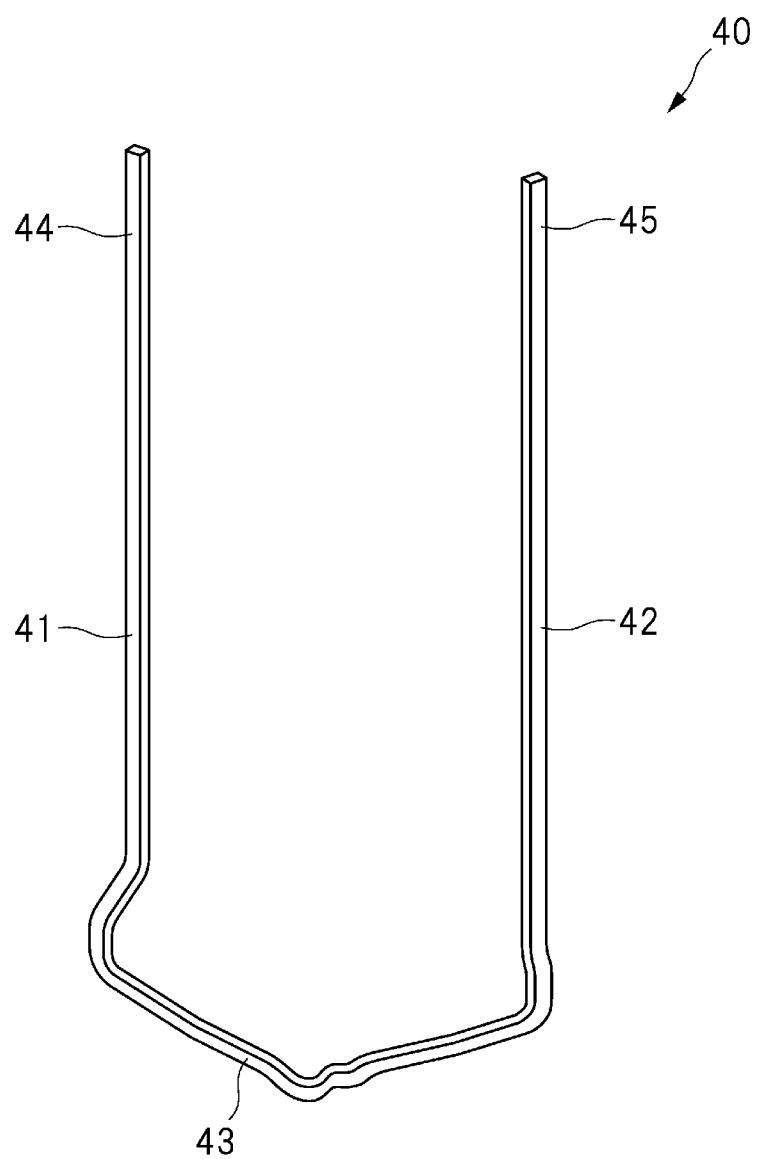
FIG. 4 is a perspective view of an example of a segment coil.

FIG. 2 is a cross-sectional view of the stator 10 taken along line A-A in FIG. 1. FIG. 3 is a cross-sectional view of the stator core 15 including a phase winding of a U phase (hereinafter referred to as U-phase coil Cu). FIG. 4 is a perspective view of one of the segment coils 40 as an example. As described later, the stator coil SC includes a phase winding of a V phase (hereinafter referred to as V-phase coil Cv) and a phase winding of a W phase (hereinafter referred to as W-phase coil Cw) as well as the U-phase coil Cu. The U-phase coil Cu, the V-phase coil Cv, and the W-phase coil Cw in the drawings have an identical coil configuration, and are wound on the stator core 15 and have phases displaced from one another by 120°.

As illustrated in FIG. 2, plural slots S1 to S48 are formed in an inner-peripheral portion of the stator core 15 of the hollow cylindrical shape at predetermined intervals in a circumferential direction. Each of the slots S1 to S48 contains the segment coil 40. The plural segment coils 40 are coupled to one another to constitute the stator coil SC. In one example, the segment coil 40 may serve as a "segment conductor". As illustrated in FIGS. 2 and 3, the segment coils 40 that constitute the U-phase coil Cu are held in the slots S1, S2, S7, S8 . . . , the segment coils 40 that constitute the V-phase coil Cv are held in the slots S5, S6, S11, S12 . . . , and the segment coils 40 that constitute the W-phase coil Cw are held in the slots S3, S4, S9, S10 . . . .

As illustrated in FIG. 4, each of the segment coils 40 bent substantially in the U shape includes a coil side 41 held in one of the slots (e.g., the slot S1), and a coil side 42 held in another slot (e.g., the slot S7) at a predetermined coil pitch. The segment coil 40 also includes an end portion 43 that couples the pair of coil sides 41 and 42 to each other, and joint end portions 44 and 45 that respectively extend from the pair of coil sides 41 and 42. It is noted that the segment coil 40 is made of a rectangular wire of a conductive material such as copper, and that the segment coil 40 except distal ends of the joint end portions 44 and 45 is coated with an insulating film of enamel, resin or the like. The end portion 43 of the segment coil 40 is not limited to a bent shape illustrated in FIG. 4 but is bent in various shapes in accordance with an assembling position with respect to the stator core 15.

Figure 5:
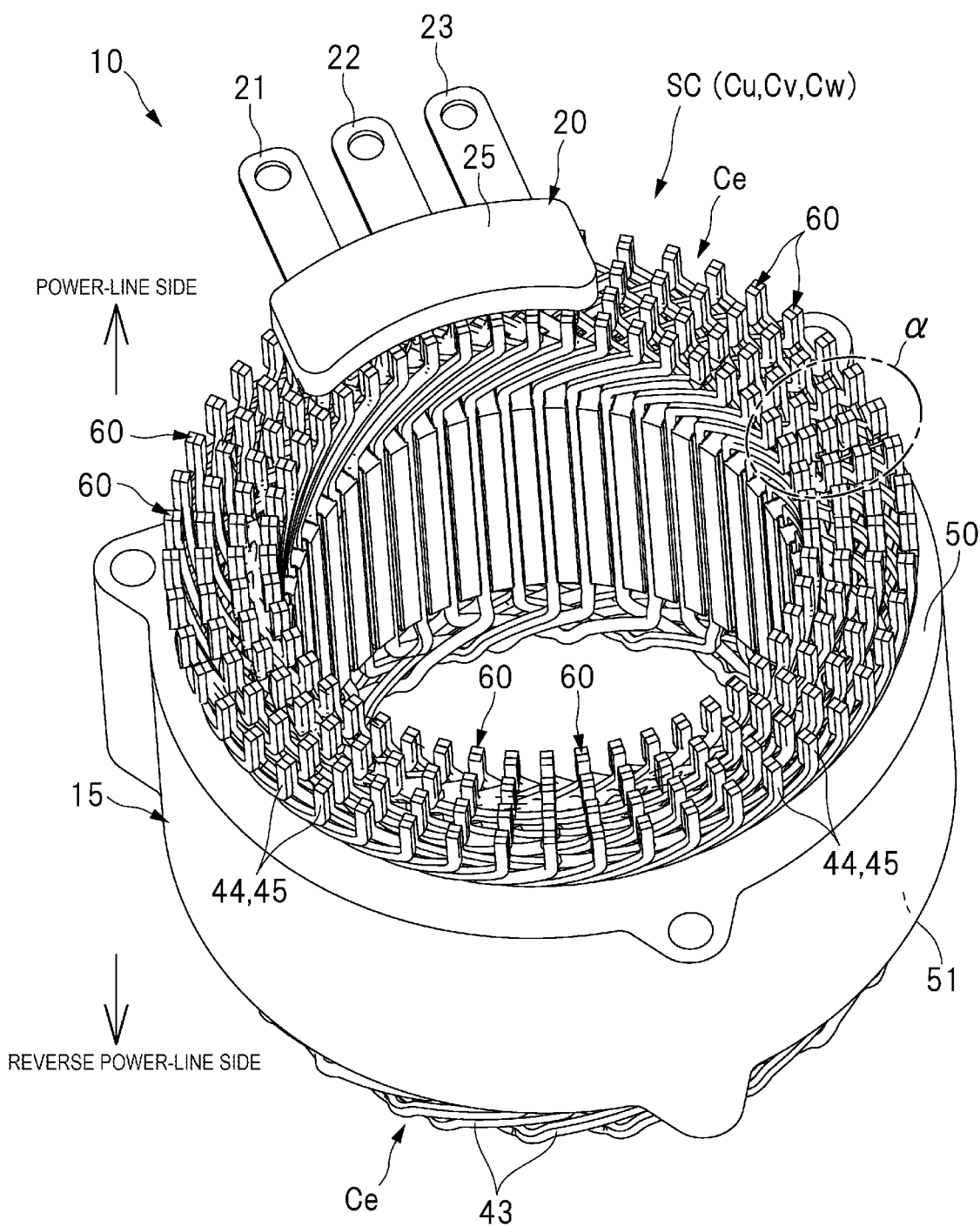
FIG. 5 is a perspective view of the stator.

FIG. 5 is a perspective view of the stator 10. FIGS. 6A and 6B are diagrams illustrating an example of a coupling state of the segment coils 40. As illustrated in FIGS. 2 and 5, the plural segment coils 40 are assembled in each of the slots S1 to S48 of the stator core 15. As illustrated in FIGS. 5, 6A, and 6B, when the segment coils 40 are assembled with the stator core 15, the joint end portions 44 and 45 of the segment coils 40 protrude from one end surface 50 of the stator core 15 to a power-line side, and the end portions 43 of the segment coils 40 protrude from the other end surface S1 of the stator core 15 to a reverse power-line side. In one example, the one end surface 50 may serve as an "end surface".

As illustrated in FIGS. 6A and 6B, the joint end portions 44 and 45 that protrude from the one end surface 50 of the stator core 15 are bent to come into contact with the joint end portions 44 and 45 of other segment coils 40 and thereafter welded to the joint end portions 44 and 45 of the other segment coils 40 in contact. Thus, the joint end portions 44 and 45 of the segment coils 40 are welded to one another into conductor joint portions 60 with which the plural segment coils 40 are coupled to one another into a single conductor. In other words, the plural segment coils 40 constitute the U-phase coil Cu, the plural segment coils 40 constitute the V-phase coil Cv, and the plural segment coils 40 constitute the W-phase coil Cw. It is noted that the joint end portions 44 and 45 after welded undergo insulating processing to form a resin film, for example, to coat the conductor.

Figure 7:
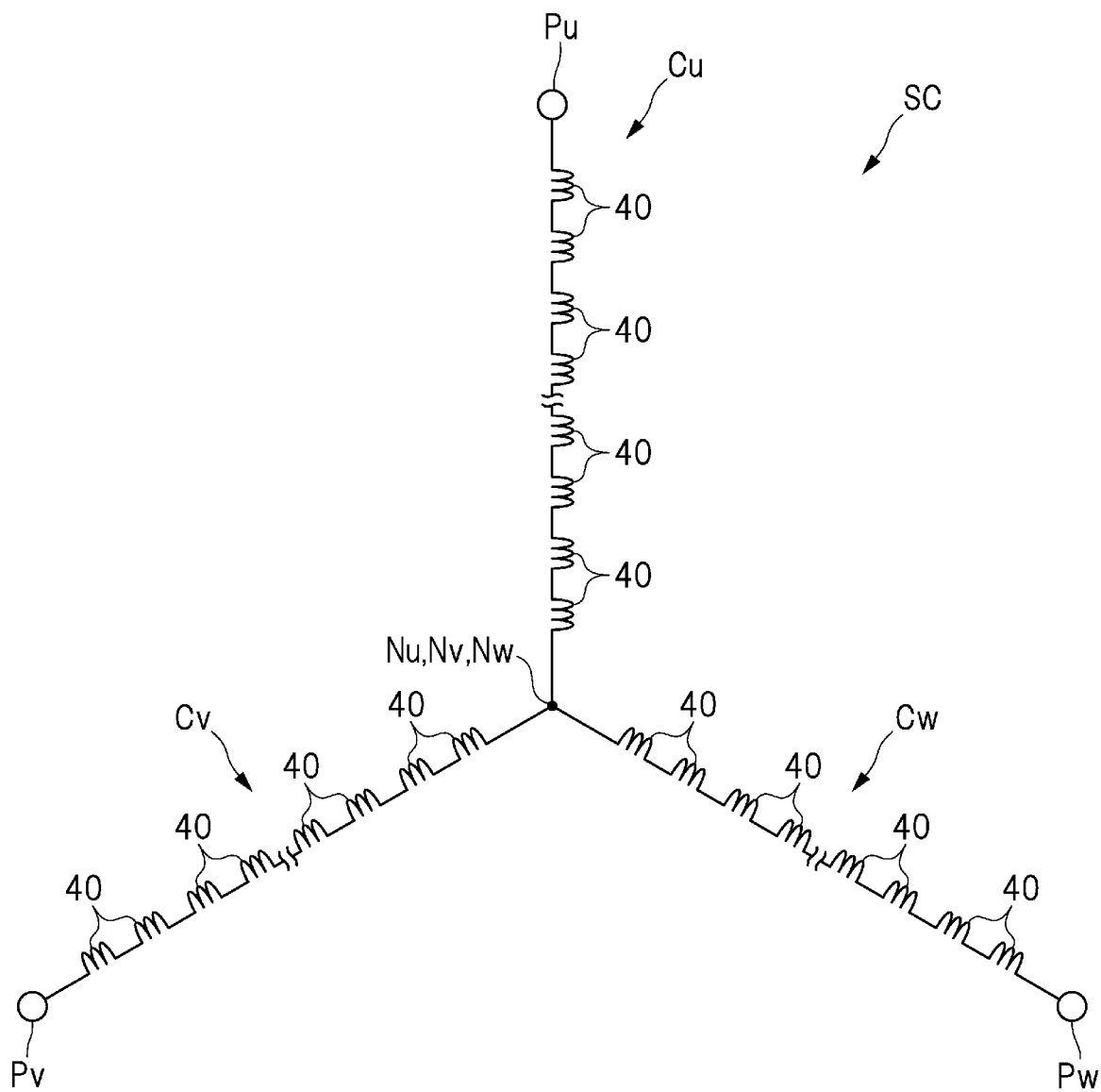
FIG. 7 is a diagram illustrating an example of a connection state of a stator coil.

FIG. 7 is a diagram illustrating an example of a connection state of the stator coil SC. As illustrated in FIG. 7, the U-phase coil Cu, the V-phase coil Cv, and the W-phase coil Cw constitute the stator coil SC. The U-phase coil Cu includes the plural segment coils 40 connected to one another in series. One end of the U-phase coil Cu serves as a power point Pu, and the other end of the U-phase coil Cu serves as a neutral point Nu. The V-phase coil Cv includes the plural segment coils 40 connected to one another in series. One end of the V-phase coil Cv serves as a power point Pv, and the other end of the V-phase coil Cv serves as a neutral point Nv. The W-phase coil Cw includes the plural segment coils 40 connected to one another in series. One end of the W-phase coil Cw serves as a power point Pw, and the other end of the W-phase coil Cw serves as a neutral point Nw. The neutral point Nu of the U-phase coil Cu, the neutral point Nv of the V-phase coil Cv, and the neutral point Nw of the W-phase coil Cw are coupled to one another. These phase coils Cu, Cv, and Cw constitute the stator coil SC.

Configuration for Temperature Detection

Figure 8:
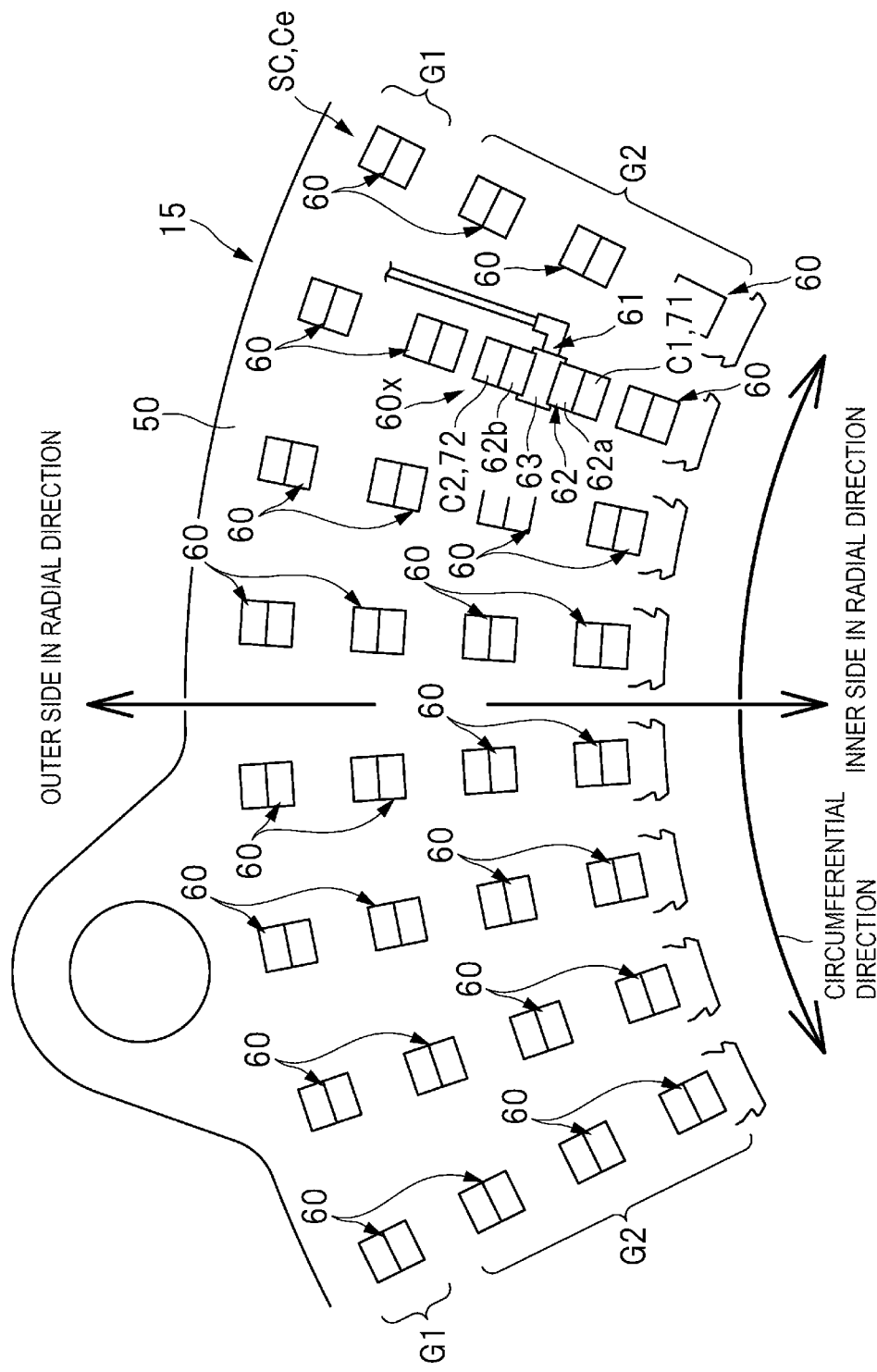
FIG. 8 is a diagram partly illustrating conductor joint portions at a coil end of the stator coil.

Next, a configuration to detect temperature of the stator coil SC will be described. FIG. 8 is a diagram illustrating some of the conductor joint portions 60 at the coil end Ce of the stator coil SC. As illustrated in FIG. 8, on the one end surface 50 side of the stator core 15, the joint end portions 44 and 45 of the segment coils 40 are welded to each other to form the plural conductor joint portions 60. These conductor joint portions 60 are arranged in both of the circumferential direction and a radial direction of the stator core 15. As a joint portion group including the plural conductor joint portions 60, there are a first joint portion group G1 located on an outermost side in the radial direction and arranged in the circumferential direction, and a second joint portion group G2 located on an inner side of the first joint portion group G1 in the radial direction. As illustrated in FIG. 8, a sensor unit 61 to detect temperature of the stator coil SC is disposed on a conductor joint portion 60x, which is one of the conductor joint portions 60 that constitute the second joint portion group G2. That is, when the plural conductor joint portions 60 are divided into the first joint portion group G1 and the second joint portion group G2, the sensor unit 61 is disposed on the conductor joint portion 60x of the second joint portion group G2.

Figure 9:
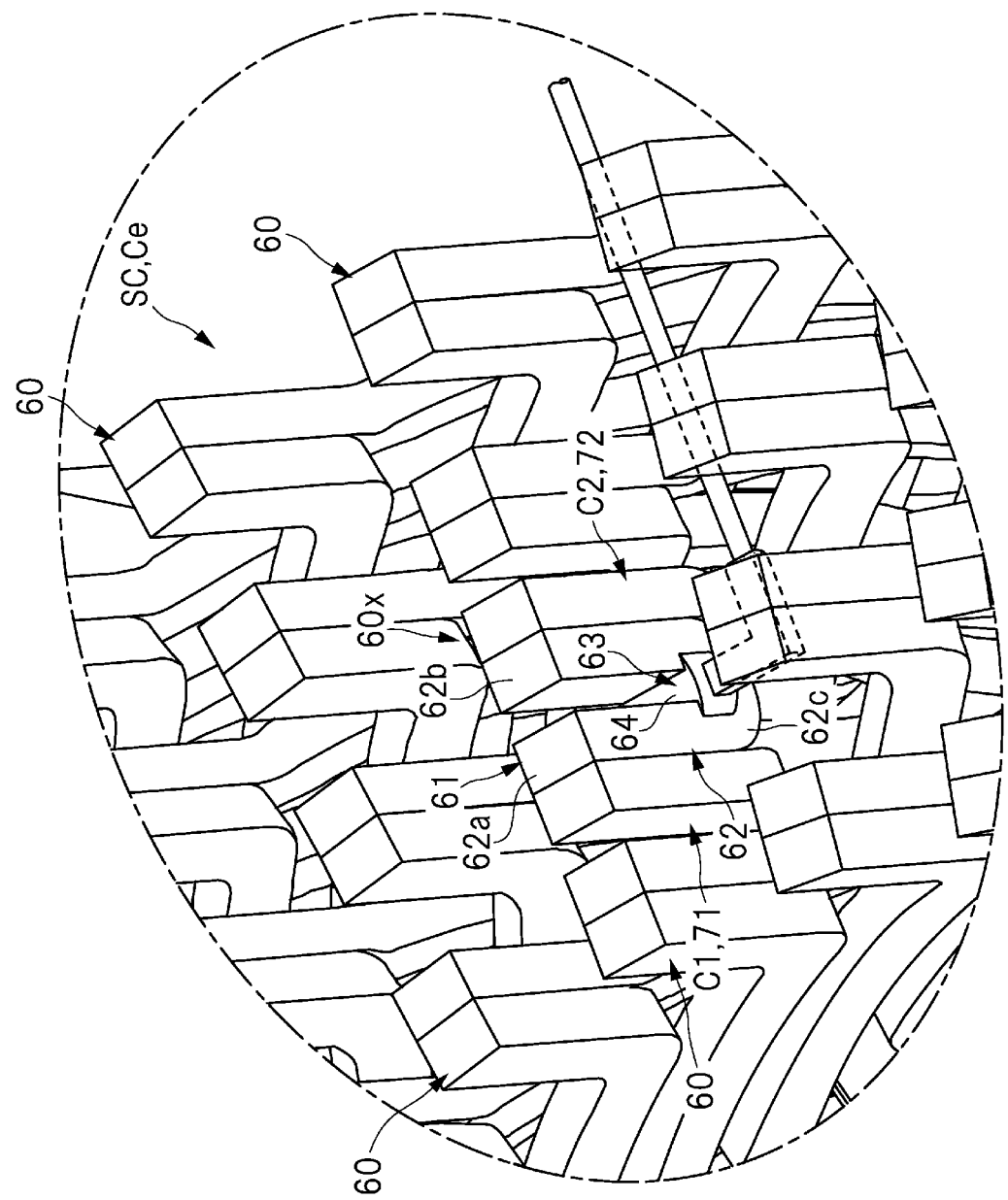
FIG. 9 is an enlarged perspective view of a range a in FIG. 5.
Figure 10:
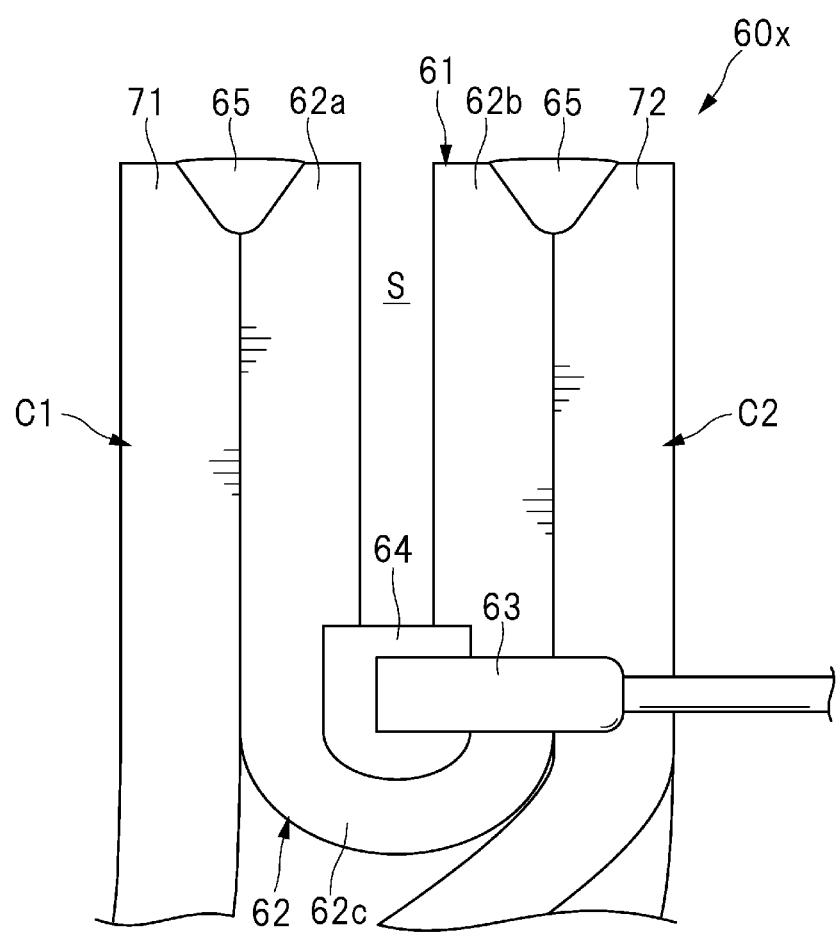
FIG. 10 is a diagram illustrating a conductor joint portion where a sensor unit is attached.

FIG. 9 is an enlarged perspective view of a range a in FIG. 5. FIG. 10 is a diagram illustrating the conductor joint portion 60x where the sensor unit 61 is attached. It is noted that although the segment coils are denoted by a reference symbol "40" in the preceding description, the segment coils 40 where the sensor unit 61 is attached will be denoted by reference symbols "C1 and C2" in the following description. As described above, the conductor joint portion 60 where the sensor unit 61 is provided is denoted by the reference symbol "60x".

As illustrated in FIGS. 9 and 10, the conductor joint portion 60x includes a joint end portion 71 of a segment coil C1, and a joint end portion 72 of a segment coil C2. In one example, the joint end portion 71 of the segment coil C1 may serve as an "end portion" of a "first segment conductor", and the joint end portion 72 of the segment coil C2 may serve as an "end portion" of a "second segment conductor". The sensor unit 61 including a sensor holding conductor 62 and a thermistor 63 is interposed between the joint end portion 71 of the segment coil C1 and the joint end portion 72 of the segment coil C2. In one example, the thermistor 63 may serve as a "temperature sensor". The sensor holding conductor 62 bent substantially in a U shape includes a joint end portion 62a extending in a straight line, a joint end portion 62b extending in a straight line, and a bent portion 62c that couples this pair of joint end portions 62a and 62b to each other. In one example, the joint end portion 62a may serve as a "first end portion", and the joint end portion 62b may serve as a "second end portion". The joint end portions 62a and 62b of the sensor holding conductor 62 are apart from each other, and a predetermined gap S is defined between the joint end portion 62a and the joint end portion 62b.

The joint end portion 62a of the sensor holding conductor 62 is welded to the joint end portion 71 of the segment coil C1, and the joint end portion 62b of the sensor holding conductor 62 is welded to the joint end portion 72 of the segment coil C2. The thermistor 63 is disposed inside the bent portion 62c of the sensor holding conductor 62, and the thermistor 63 is secured to the sensor holding conductor 62 with an encapsulating material 64 such as resin. That is, the thermistor 63 to detect temperature is held inside the bent portion 62c of the sensor holding conductor 62. It is noted that the sensor holding conductor 62 is made of a rectangular wire of the same material as the segment coils C1 and C2, namely, a conductive material such as copper.

In this manner, the sensor unit 61 is attached to the conductor joint portion 60x so that temperature of the stator coil SC can be appropriately detected. That is, because the sensor unit 61 is assembled to the coil end Ce of the stator coil SC, measurement of the temperature of the stator coil SC can be performed at a location where a higher degree of temperature can be obtained than when the sensor unit 61 is assembled to the bus bar unit 20. Moreover, because the thermistor 63 is surrounded by the bent portion 62c of the sensor holding conductor 62 that generates heat when powered, measurement of the temperature of the stator coil SC can be performed at a location where a higher degree of temperature can be obtained.

Furthermore, as illustrated in FIG. 8, the sensor unit 61 is disposed in the second joint portion group G2 on the inner side in the radial direction. From this point of view as well, the temperature of the stator coil SC can be appropriately detected. That is, because an inner-peripheral portion of the coil end Ce is less likely to be cooled than an outer-peripheral portion of the coil end Ce, the sensor unit 61 is disposed in the second joint portion group G2 so that measurement of the temperature of the stator coil SC can be performed at a location where a higher degree of temperature can be obtained. Besides, as illustrated in FIG. 1, because cooling oil is supplied to the outer-peripheral portion of the coil end Ce, temperature of the outer-peripheral portion of the coil end Ce is more likely to be low than other portions. Even with such a cooling structure, the sensor unit 61 is disposed in the second joint portion group G2 so that measurement of the temperature of the stator coil SC can be performed at a location where a higher degree of temperature can be obtained.

Manufacturing Method

Figure 11:
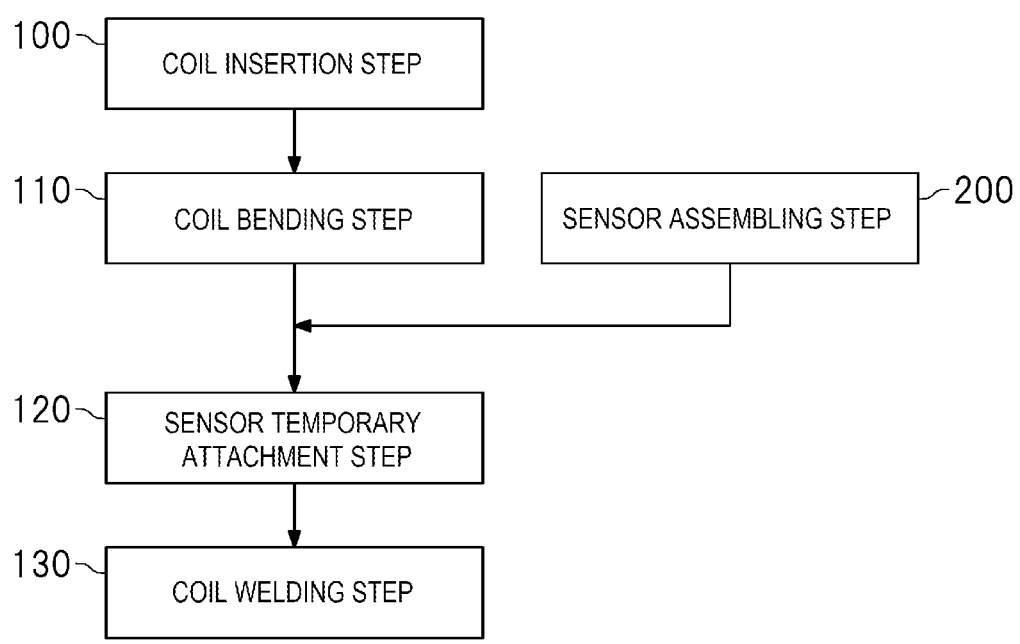
FIG. 11 is a simplified flowchart of part of a manufacturing method of the stator.
Figure 12A:
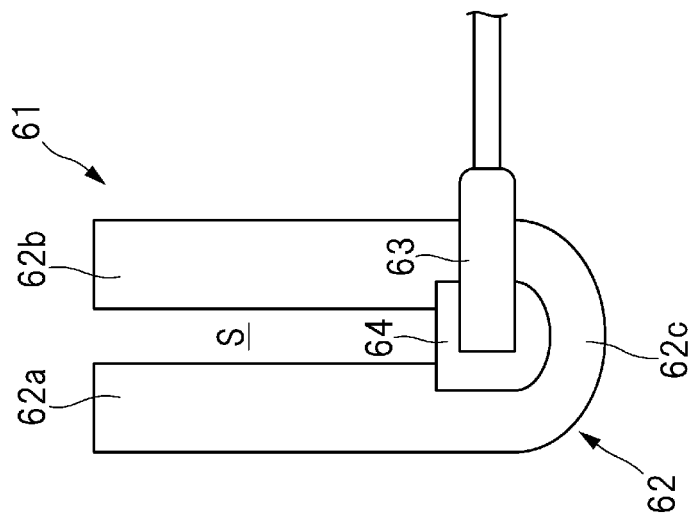
FIGS. 12A and 12B are diagrams illustrating an assembling process of the sensor unit.
Figure 12B:
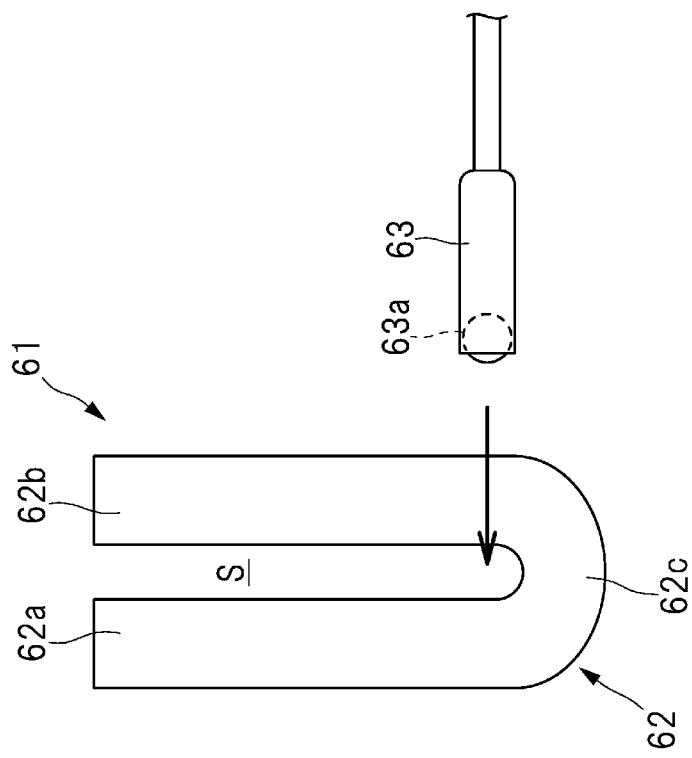

Next, a manufacturing method of the stator 10 according to the embodiment of the disclosure will be described. FIG. 11 is a simplified flowchart of part of the manufacturing method of the stator 10. FIGS. 12A and 12B are diagrams illustrating an assembling process of the sensor unit 61. FIGS. 13A to 13C are diagrams illustrating an attachment process of the sensor unit 61 to the conductor joint portion 60x.

As illustrated in FIG. 11, a manufacturing process of the stator 10 includes a coil insertion step 100 of inserting the segment coils 40 into the stator core 15, and a coil bending step 110 of bending the joint end portions of the segment coils 40. At the coil insertion step 100, as illustrated in FIGS. 2 and 6A, the plural segment coils 40 are inserted into the plural slots S1 to S48 formed in the stator core 15. At the coil bending step 110, as illustrated in FIGS. 6B and 8, the joint end portions 44 and 45 of the segment coils 40 that protrude from the one end surface 50 of the stator core 15 are bent to provide the plural conductor joint portions 60 in both of the circumferential direction and the radial direction of the stator core 15.

As illustrated in FIG. 11, the manufacturing process of the stator 10 also includes a sensor assembling step 200 of assembling the sensor unit 61. At the sensor assembling step 200, as illustrated in FIG. 12A, a measurement member 63a of the thermistor 63 is contained within the bent portion 62c of the sensor holding conductor 62, and as illustrated in FIG. 12B, the thermistor 63 is secured to the sensor holding conductor 62 with the encapsulating material 64 such as resin. In this manner, the thermistor 63 is secured to the sensor holding conductor 62 so as to form the sensor unit 61 including the sensor holding conductor 62 and the thermistor 63. In some embodiments, in order to detect a higher degree of temperature of the stator coil SC, the measurement member 63a of the thermistor 63 is in contact with the sensor holding conductor 62.

As illustrated in FIG. 11, the manufacturing process of the stator 10 further includes a sensor temporary attachment step 120 of attaching the sensor unit 61 to the conductor joint portion 60x, and a coil welding step 130 of welding the conductor joint portions 60, 60x by TIG welding, for example. At the sensor temporary attachment step 120, as illustrated in FIG. 13A, the sensor unit 61 including the sensor holding conductor 62 and the thermistor 63 is inserted between the first segment coil C1 and the second segment coil C2 that constitute the conductor joint portion 60x. At the coil welding step 130, as indicated by a symbol X in FIG. 13B, the joint end portion 71 of the segment coil C1 and the joint end portion 62a of the sensor holding conductor 62 are welded to each other, and the joint end portion 72 of the segment coil C2 and the joint end portion 62b of the sensor holding conductor 62 are welded to each other. Thus, as illustrated in FIG. 13C, the segment coils C1 and C2, and the sensor holding conductor 62 are jointed to each other with penetration portions 65 formed by welding. It is noted that at the coil welding step 130, other conductor joint portions 60 without the sensor unit 61 are also welded. That is, at the coil welding step 130, the plural conductor joint portions 60, 60x are individually welded.

At the coil welding step 130, heat generated by welding is transmitted to the thermistor 63. However, as illustrated in FIG. 13B, the joint end portion 62a and the joint end portion 62b of the sensor holding conductor 62 are apart from each other so that the heat can be released to the gap S to enhance heat dissipation of the joint end portions 62a and 62b, thereby protecting the thermistor 63 from the heat generated by welding. Moreover, the joint end portions 62a and 62b of the sensor holding conductor 62 are elongated to make the thermistor 63 apart from welding locations indicated by the symbol X so that the thermistor 63 can be protected from the heat generated by welding.

As described above, the sensor unit 61 including the sensor holding conductor 62 and the thermistor 63 is formed and attached to the conductor joint portion 60x so as to facilitate attachment of the thermistor 63 to the stator coil SC. That is, when the thermistor 63 is attached to the stator coil SC, the thermistor 63 is handled not solely but as the sensor unit 61. This notably facilitates handling of the thermistor 63 in the manufacturing process.

It is needless to say that the disclosure is not limited to the foregoing embodiments and various modifications can be made thereto within the scope that does not depart from the gist thereof. In the foregoing description, the sensor unit 61 is attached to the conductor joint portion 60x including the two segment coils C1 and C2. However, this is not to be construed in a limiting sense. The sensor unit 61 may be attached to a conductor joint portion including three or more segment coils 40. That is, in the foregoing description, the plural segment coils 40 are connected in series to constitute each of the phase coils Cu, Cv, and Cw. However, this is not to be construed in a limiting sense. The plural segment coils 40 may be connected in parallel to constitute each of the phase coils Cu, Cv, and Cw. For example, when the two segment coils 40 are connected in parallel, the four segment coils 40 form a conductor joint portion. In this manner, even in the case of forming a conductor joint portion including three or more segment coils 40, the sensor unit 61 is interposed between the segment coils 40 that constitute the conductor joint portion so as to appropriately detect the temperature of the stator coil SC.

In the foregoing description, in view of detecting the temperature of the stator coil SC at a location where a higher degree of temperature is obtained, the sensor unit 61 is disposed on the conductor joint portion 60x belonging to the second joint portion group G2. However, this is not to be construed in a limiting sense. For example, depending upon a temperature distribution of the stator coil SC that generates heat, the sensor unit 61 may be disposed on the conductor joint portion 60 belonging to the first joint portion group G1. In the foregoing description, the thermistor 63 is used as the temperature sensor. However, this is not to be construed in a limiting sense. Other temperature sensors may be used. In the foregoing description, the conductor joint portions 60 are welded by arc welding such as TIG welding. However, this is not to be construed in a limiting sense. The conductor joint portions 60 may be welded by laser welding, for example. It is noted that in the example illustrated in FIG. 1, cooling oil is supplied to the coil end Ce of the stator coil SC. However, this is not to be construed in a limiting sense. The disclosure is applicable to the stator 10 including other cooling structures.

In the illustrated example, the eight segment coils 40 are inserted into each slot. However, this is not to be construed in a limiting sense. For example, more than eight segment coils 40 may be inserted into each slot, and less than eight segment coils 40 may be inserted into each slot. In the foregoing description, the stator core 15 where the number of the slots is 48 is used. However, this is not to be construed in a limiting sense. The stator core 15 with another number of the slots may be used.

The invention claimed is:

1. A stator configured to be installed in a rotary electric machine, the stator comprising:
   a stator core having a hollow cylindrical shape, the stator core comprising slots;
   a stator winding comprising segment conductors respectively inserted in the slots, the segment conductors comprising a first segment conductor and a second segment conductor; and
   a sensor unit comprising:
      a sensor holding conductor welded to the first segment conductor and the second segment conductor; and
      a temperature sensor held by the sensor holding conductor,
   wherein the sensor holding conductor comprises:
      a first segment having a first end portion welded to a first end portion of the first segment conductor,
      a second segment having a second end portion welded to a second end portion of the second segment conductor, and
      a bent portion coupling the first segment and the second segment to each other, and
   wherein the temperature sensor is attached to the first segment and the second segment, and is held on an inner side of the bent portion.

2. The stator according to claim 1, wherein the first end portion and the second end portion are apart from each other.

3. The stator according to claim 2,
   wherein the stator winding comprises conductor joint portions, the conductor joint portions being formed by welding the first and second end portions of the segment conductors to each other, the first and second end portions of the segment conductors protruding from an end surface of the stator core, the conductor joint portions being arranged in both of a circumferential direction and a radial direction of the stator core, and
   wherein when the conductor joint portions are divided into a first joint portion group located on an outermost side in the radial direction and arranged in the circumferential direction, and a second joint portion group located further inward than the first joint portion group in the radial direction, the sensor unit is disposed in one of the conductor joint portions which constitute the second joint portion group.

4. The stator according to claim 1,
wherein the stator winding comprises conductor joint portions, the conductor joint portions being formed by welding the first and second end portions of the segment conductors to each other, the first and second end portions of the segment conductors protruding from an end surface of the stator core, the conductor joint portions being arranged in both of a circumferential direction and a radial direction of the stator core, and
wherein when the conductor joint portions are divided into a first joint portion group located on an outermost side in the radial direction and arranged in the circumferential direction, and a second joint portion group located further inward than the first joint portion group in the radial direction, the sensor unit is disposed in one of the conductor joint portions which constitute the second joint portion group.

5. The stator according to claim 1, wherein the temperature sensor is secured to the sensor holding conductor with an encapsulating material.

6. The stator according to claim 1, wherein the temperature sensor is attached to both of the first segment of the sensor holding conductor and the second segment of the sensor holding conductor via an encapsulating material.

7. The stator according to claim 1, wherein the bent portion is in contact with the first segment conductor, and
wherein the bent portion is in contact with the second segment conductor.

8. The stator according to claim 1, wherein the temperature sensor is disposed to penetrate through a gap between the first segment of the sensor holding conductor and the second segment of the sensor holding conductor.

9. The stator according to claim 8, wherein the temperature sensor is secured to the sensor holding conductor with an encapsulating material filled in the gap contacting the bent portion.

10. The stator according to claim 1, wherein the temperature sensor contacts an inside surface of the first segment of the sensor holding conductor, the inside surface being on an opposite side to the first segment conductor.

11. The stator according to claim 1, wherein the temperature sensor contacts an inside surface of the second segment of the sensor holding conductor, the inside surface being on an opposite side to the second segment conductor.

12. The stator according to claim 1, wherein the temperature sensor contacts an inside surface of the first segment of the sensor holding conductor, the inside surface being on an opposite side to the first segment conductor, and
wherein the temperature sensor contacts an inside surface of the second segment of the sensor holding conductor, the inside surface being on an opposite side to the second segment conductor.

13. The stator according to claim 1, wherein the temperature sensor is positioned on both of the inner side of the bent portion and an outer side of the bent portion.

14. The stator according to claim 1, wherein the first end portion of the sensor holding conductor and the second end portion of the sensor holding conductor are located apart from the bent portion,
wherein the first end portion of the sensor holding conductor and the second end portion of the sensor holding conductor are separated from each other to form a gap therebetween, and
wherein the temperature sensor is disposed in the gap.

15. The stator according to claim 1, wherein a distance between the first end portion of the sensor holding conductor and the bent portion is set based on heat generated from the welding, and
wherein a size of the first segment of the sensor holding conductor corresponds to the distance.

16. A manufacturing method configured to be installed in a stator of a rotary electric machine, the method comprising:
inserting segment conductors respectively into slots formed in a stator core having a hollow cylindrical shape;
bending a first end portion and a second end portion of the segment conductors which protrude from an end surface of the stator core so as to arrange conductor joint portions in both of a circumferential direction and a radial direction of the stator core, the conductor joint portions comprising the first and second end portions of the segment conductors;
temporarily attaching a sensor unit between a first segment conductor and a second segment conductor that constitute one of the conductor joint portions, the sensor unit comprising a sensor holding conductor and a temperature sensor; and
welding the conductor joint portions individually so as to form a stator winding with the segment conductors, the welding comprising:
welding the first segment conductor and a first segment of the sensor holding conductor to each other; and
welding the second segment conductor and a second segment of the sensor holding conductor to each other,
wherein the temperature sensor is attached to the first segment and the second segment.

17. The manufacturing method according to claim 16, wherein when the conductor joint portions are divided into a first joint portion group located on an outermost side in a radial direction and arranged in a circumferential direction, and a second joint portion group located further inward than the first joint portion group in the radial direction, the temporarily attaching comprises disposing the sensor unit on one of the conductor joint portions which constitute the second joint portion group.

* * * * *